(12) United States Patent
Gauthier et al.

(10) Patent No.: US 6,580,980 B1
(45) Date of Patent: Jun. 17, 2003

(54) SYSTEM AND METHOD FOR TESTING DEFLATED TIRE HANDLING

(75) Inventors: Patrice Noël Germain Gauthier, Chappes (FR); Jean-Marc Lhermet, St-Amand-Tallende (FR); Mark William Ludlow, Greer, SC (US); Michiya Kasai, Tokyo (JP); Piero Taramasso, Chateaugay (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/091,375

(22) Filed: Mar. 5, 2002

(51) Int. Cl.$^7$ .............................................. G06F 13/00
(52) U.S. Cl. .......................................... 701/29; 73/146
(58) Field of Search ............................. 701/29; 73/146, 73/146.2

(56) References Cited

U.S. PATENT DOCUMENTS

| | | | |
|---|---|---|---|
| 4,969,212 A | | 11/1990 | Walter |
| 5,239,469 A | * | 8/1993 | Walker et al. ................. 701/29 |
| 5,248,957 A | * | 9/1993 | Walker et al. ............... 340/444 |
| 5,561,415 A | * | 10/1996 | Dieckmann ................. 340/444 |
| 5,862,499 A | * | 1/1999 | Jones .......................... 701/29 |
| 5,891,277 A | * | 4/1999 | Bachhuber ................. 152/415 |
| 5,929,756 A | * | 7/1999 | Randazzo et al. .......... 340/444 |
| 6,278,361 B1 | * | 8/2001 | Magiawala et al. ......... 340/438 |
| 6,278,363 B1 | * | 8/2001 | Bezek et al. ................ 340/442 |
| 6,285,280 B1 | * | 9/2001 | Wang .......................... 340/444 |
| 6,317,667 B1 | * | 11/2001 | Oshiro ........................ 701/29 |
| 6,340,930 B1 | * | 1/2002 | Lin ............................. 340/447 |
| 6,404,330 B1 | * | 6/2002 | Sugisawa ..................... 340/444 |
| 6,407,661 B2 | * | 6/2002 | Arita et al. .................. 340/444 |

OTHER PUBLICATIONS

Walter Lee Willard, Jr. *Self–Supporting Tire Performance Criteria and Testing*, Michelin Americas Research and Development Corp., Dec. 1997.

* cited by examiner

Primary Examiner—William A. Cuchlinski, Jr.
Assistant Examiner—Olga Hernandez
(74) Attorney, Agent, or Firm—Dority & Manning, Attorneys at Law, P.A.

(57) ABSTRACT

A subjective test method for characterizing the deflated handling performance of self-supporting tires includes the steps of positioning tires on selected wheels of a test vehicle and then subjecting the tire—test vehicle combination to a plurality of different driving maneuvers such that a variety of testing objectives can be evaluated. Exemplary driving maneuvers are representative of a vehicle's operation in steady state, transient state, throttle lift-off, and/or emergency driving situations. Testing objectives that are obtained in accordance with each test maneuver may include both objective criteria that may be obtained via vehicle instrumentation and subjective criteria that may be assigned grade ratings by a test driver. Uniformity of testing maneuvers and driver solicitation is preferred to minimize dispersion in test results. A standardized reporting grid is also provided in accordance with the disclosed technology such that the results of the testing objectives may be properly documented. Selected test data are then used to provide performance ratings for tire acceptability levels. Some performance ratings are automatically calculated through an established algorithm, and all ratings are preferably provided on a common rating scale.

33 Claims, 9 Drawing Sheets

| Subjective Grade: | Point Rating: |
|---|---|
| A | 6.0 |
| A/B | 5.0 |
| B | 4.0 |
| B/C | 3.0 |
| C | 2.0 |
| C/D | 1.0 |
| D | 0.0 |

| Automatic Rating System | | | | | | | | |
|---|---|---|---|---|---|---|---|---|
| Batch # 200041B | | Set 1 | Batch # 200049B | Set 2 | Batch # 210004A | Set 3 | Batch # 210004B | Set 4 |
| Grade Rating | | Point | Letter | Point | Letter | Point | Letter | Point |
| C/D | | 1.0 | B | 4.0 | B/C | 3.0 | B | 4.0 |
| C | | 2.0 | C | 2.0 | B | 4.0 | B | 4.0 |
| C/D | | 1.0 | C | 2.0 | B/C | 3.0 | B | 4.0 |
| C | | 2.0 | B/C | 3.0 | B | 4.0 | A/B | 5.0 |
| C | | 2.0 | B/C | 3.0 | B | 4.0 | A/B | 5.0 |
| C | | 2.0 | B/C | 3.0 | B | 4.0 | A/B | 5.0 |
| Point Average | | 1.67 | | 2.83 | | 3.67 | | 4.5 |
| Rounded Point Average | | 2.0 | | 3.0 | | 4.0 | | 5.0 |
| G - Rating | | 36 | | 47 | | 49 | | 54 |
| Initial Rating | | 33 | | 44 | | 49 | | 55 |

Figure 12

| | Lane Change Limit Speed: | 20mph/30kph | 25mph/40kph | 30mph/50kph | >30mph/50kph |
|---|---|---|---|---|---|
| J-TURN/ EMERGENCY LANE CHANGE UNSEAT CLASS: | | | | | |
| CLASS 1 | | 30 | 35 | 40 | X |
| CLASS 2 | | 25 | 30 | 35 | X |
| CLASS 3 | | 20 | 25 | 30 | 35 |

Figure 13

SYSTEM AND METHOD FOR TESTING DEFLATED TIRE HANDLING

FIELD OF THE INVENTION

The present invention generally concerns a system for characterizing the handling performance of tires, and more particularly, concerns a test procedure used to evaluate various parameters related to handling characteristics of self-supporting tires. The subject test procedure is preferably utilized in conjunction with a common reporting grid and rating scale to yield a standardized system for evaluating tire performance.

BACKGROUND OF THE INVENTION

The ability to effectively operate a vehicle after experiencing loss of tire pressure offers many practical advantages. The benefits that such a driving ability can provide has led to consumer demand for and commercial development of "self-supporting" or "run-flat" tires. Such tires typically incorporate additional supportive features to provide a vehicle with extended mobility upon the event that a tire loses air pressure. Examples of the type of supportive features characteristic of a self-supporting tire may include special bead designs, sidewall reinforcements, summit adjustments, internal tire safety supports, etc.

Several specific self-supporting tire designs are currently available in the marketplace, including the ZP (Zero Pressure) brand tire and the PAX brand tire system of Michelin North America, Inc. Selected aspects of such extended mobility products are disclosed in U.S. Pat. Nos. 5,868,190 (Willard Jr. et al.), 5,891,279 (Lacour), and 5,749,984 (Frey et al.). Each of the foregoing patents is hereby fully incorporated into this application for all purposes by present reference thereto.

Future development of self-supporting tires and related products requires effective evaluation of their performance characteristics. A self-supporting tire preferably achieves desired levels of performance when the tire is both inflated and deflated. Since a major objective of self-supporting tires is to provide mobility upon a tire losing pressure, notable evaluation criteria often relate to deflated mobility performance.

In general, it is preferred to develop self-supporting tires that can achieve certain fundamental objectives, including operation at a level comparable to that of a conventional inflated tire. Examples of other performance objectives include enhanced low-pressure handling capabilities and bead retention, and acceptable handling and sufficient durability at zero pressure situations. In whole, the goal for designing a self-supporting tire is to enable a motorist to continue driving for some distance in a relatively effective manner and appropriate fashion even after a loss of tire pressure.

In order to determine when a self-supporting tire achieves its preferred performance objectives, comprehensive tests are desired so as to provide standardized evaluation of tire performance. It may thus be desirable to develop a deflated handling test that would provide a reliable measure of tire performance when a tire—vehicle combination is subjected to a plurality of predetermined driving maneuvers. Such a deflated handling test is preferably formulated in such a particular way that the test results provide a standardized system for evaluating tire handling characteristics. A testing system may preferably be designed such that dispersion of test results among different testers at different times or on different test vehicles is minimized.

An example of methodology relating to the measurement of tire handling characteristics is disclosed in U.S. Pat. No. 4,969,212 (Walter), which by reference is hereby incorporated into the present application for all purposes. While various systems and procedures have been developed that relate to self-supporting tire technology and to general tire testing methodology, no design has emerged that generally encompasses all of the desired characteristics as hereafter presented in accordance with the subject technology.

BRIEF SUMMARY OF THE INVENTION

In view of the recognized features encountered in the prior art and addressed by the present subject matter, an improved testing system for characterizing deflated tire handling performance has been developed. Aspects of the varied embodiments of the subject testing system include a standardized testing procedure, a uniform reporting grid, and a common rating scale. Exemplary testing procedures preferably involve subjecting a test vehicle with selected deflated tires to a multitude of driving maneuvers. Both subjective perceptions and objective measurements are then preferably obtained in accordance with predetermined characteristics exhibited by the tested tire during the driving maneuvers. A common philosophy and approach is preferably established for the driving maneuvers and performance perceptions such that uniform results are more easily obtained. The performance perception ratings are then preferably inputted to an algorithm that provides an overall subjective rating of a tire's deflated handling performance.

Various features and aspects of the subject testing system and related procedure offer a plurality of advantages. Establishing a common and particular testing system and method preferably enables the dispersion level of the new method to improve upon existing test method dispersion levels. The subject system also preferably provides a testing procedure such that the minimum threshold level of tire acceptability is the same for a variety of worldwide testing facilities, personnel, and products. The disclosed testing methodology is also preferably formulated such that communication about the testing system among internal and external entities in the marketplace is readily facilitated.

Yet another advantage of aspects of the presently disclosed technology is that the subject method involves subjecting a tire—test vehicle combination to a variety of different maneuvers such that numerous potential driving conditions are simulated. Exemplary embodiments of the subject deflated handling test procedures may incorporate selected maneuvers including steady state, throttle lift off, transient state, and emergency maneuvers.

Although a standardized testing procedure utilized by numerous testing groups may offer more uniform results and a common rating scale, the testing methodology and related features disclosed herein provide many testing options. Not only can different driving maneuvers be incorporated into a testing process, but so can the various subjective and objective criteria that are rated in accordance with a handling performance test.

In one exemplary embodiment of the present subject matter, a method for rating the handling performance of tires involves positioning selected tires on a test vehicle and subjecting the tire—test vehicle combination to certain predetermined maneuvers. Performance ratings are then preferably obtained in accordance with the predefined maneuvers.

More preferably, such a method for rating handling performance includes several steps, including obtaining a g-value corresponding to the lateral acceleration of the test vehicle during a selected predetermined maneuver and at a point when the tire exhibits an established level of stability. In accordance with the subject exemplary embodiment, steady state and transient ratings are also assigned when the tire—test vehicle combination is subjected to steady state and transient maneuvers, respectively. The assigned steady state and transient ratings and the obtained g-value are then used to calculate an initial tire performance rating.

Another exemplary embodiment of the present technology concerns a rating process for subjectively evaluating the deflated handling performance of tires. Such a rating process may incorporate the assignment of various ratings corresponding to the handling performance of a deflated tire when subjected to predetermined maneuvers. The maneuvers and corresponding ratings preferably represent at least one of each steady state, transient, and emergency driving situations. A deflated tire performance rating is then preferably obtained via algorithmic formulas wherein the steady state, transient, and emergency ratings are provided as input to the algorithm. In other related exemplary embodiments, a throttle lift off maneuver and corresponding rating may also be obtained and incorporated into the overall deflated tire performance rating.

Yet another exemplary embodiment of the subject methodology relates to a subjective test method used to provide a performance rating for self-supporting tires. In accordance with this particular embodiment, a self-supporting tire is positioned on a test vehicle, which is then subjected to a plurality of testing maneuvers. When the tire-vehicle combination is subjected to a steady state testing maneuver, a value for the lateral acceleration of the test vehicle is preferably obtained when the tire achieves a predetermined level of stability. At least one steady state grade is also assigned to selected performance variables when the tire—test vehicle combination is subjected to a steady state maneuver. The tire—test vehicle combination is also preferably subjected to at least one throttle lift-off maneuver, at least one transient maneuver, and at least one emergency maneuver, at which point respective values are assigned to performance variables for each maneuver. All performance values, including lateral acceleration, steady state performance variable(s), transient performance variable(s), throttle lift-off performance variable(s), and emergency performance variable(s) are then preferably utilized to calculate a tire performance rating.

A still further exemplary embodiment of the disclosed testing technology corresponds to a comprehensive system for evaluating tire handling performance, comprising a testing process, a reporting grid, and an algorithm. A tire is preferably subjected to a plurality of predetermined maneuvers in accordance with the testing process such that performance ratings representative of aspects of tire handling performance are determined. The performance ratings and other data may then be recorded in the standardized reporting grid, and a predetermined combination of that information is then preferably used to calculate an overall tire performance rating.

An additional embodiment of aspects of the present subject matter concerns a standardized algorithm for obtaining a deflated performance rating for self-supporting tires. A self-supporting tire is positioned on a test vehicle and the resultant combination then endures a plurality of maneuvers, and various test ratings are obtained in accordance with deflated handling performance during such maneuvers. The standardized algorithm also preferably includes the steps of obtaining a g-value for the lateral acceleration of the test vehicle when the tire-vehicle system achieves a predetermined level of instability upon subjection to a steady state driving maneuver and assigning a plurality of performance values for predefined testing criteria based on deflated tire performance when subjected to certain maneuvers. An initial tire rating may then be calculated based on the g-value and the assigned plurality of performance values. Emergency performance values may also preferably be obtained in accordance with this exemplary algorithm and selected of these emergency performance values in combination with the initial tire rating may then be used to calculate an overall tire rating.

Additional objects and advantages of the present subject matter are set forth in, or will be apparent to, those of ordinary skill in the art from the detailed description herein. Also, it should be further appreciated that modifications and variations to the specifically illustrated, referred and discussed features and steps hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of this invention may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in this summarized section, may include and incorporate various combinations of aspects of features, components, or steps referenced in the summarized objectives above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 12 displays an exemplary conversion table applying the exemplary conversion table of FIG. 10 and the exemplary conversion process referenced in FIG. 11 to selected of the exemplary data reported in the grid of FIG. 8; and FIG. 13 displays an exemplary conversion table for providing additional adjustments to an overall tire performance rating in accordance with the present subject matter.

Figure 1:
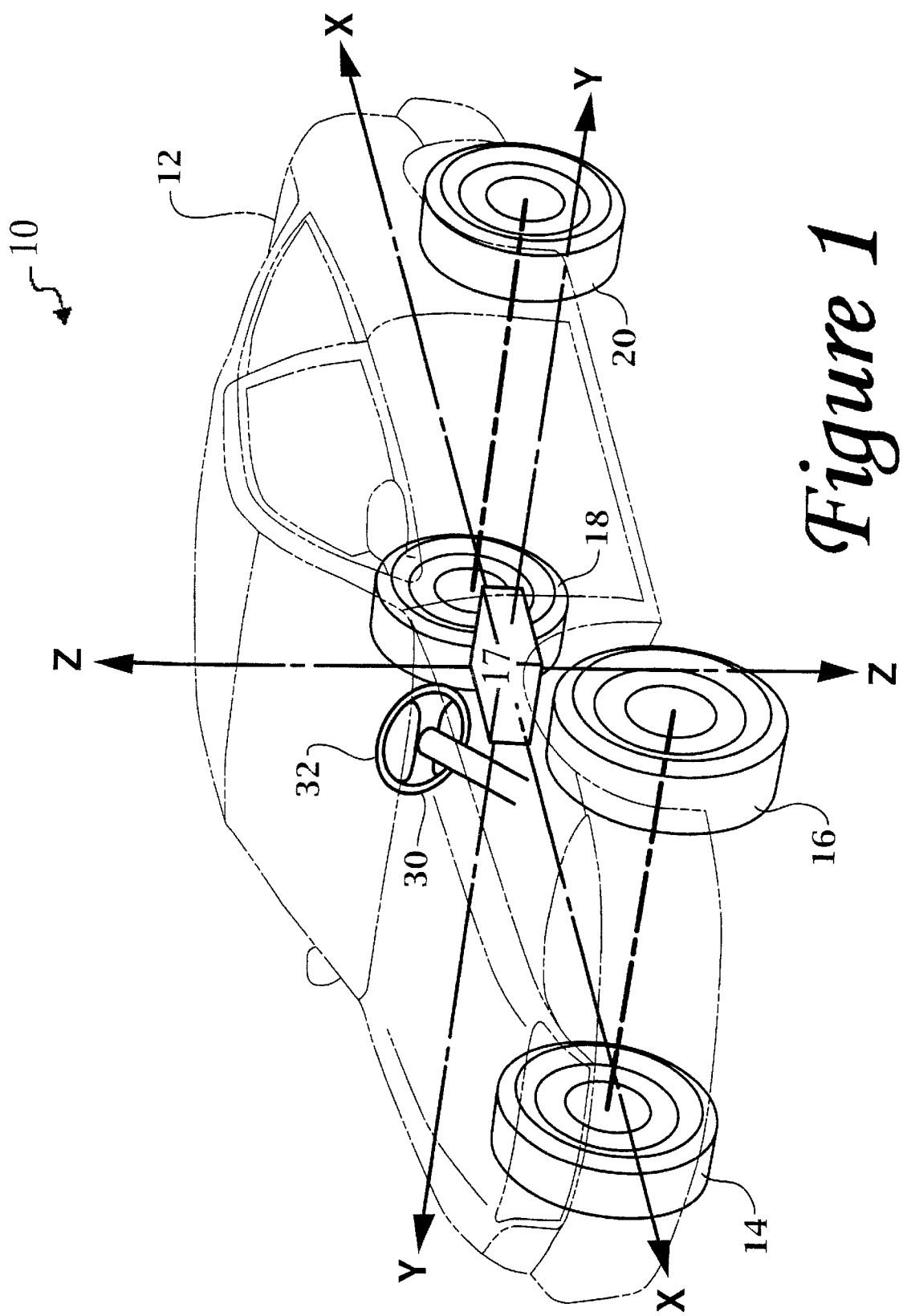
FIG. 1 provides a perspective view of an exemplary tire—test vehicle combination in accordance with the subject system and method for testing tire handling performance.

Repeat use of reference characters throughout the present specification and appended drawings is intended to represent same or analogous features or elements of the invention.

DETAILED DESCRIPTION OF THE PREFERRED EMBODIMENTS

As discussed in the Brief Summary of the Invention section, the present subject matter is particularly concerned with a testing system and related methodology for characterizing tire handling performance. Selected embodiments of the subject system and method as hereafter discussed may focus on the characterization of deflated tire handling performance and/or when such tires incorporate self-supporting features into their design. Although some exemplary embodiments focus on this particular type of tire testing, it should be appreciated that aspects of the disclosed technology may also readily be utilized in accordance with inflated tire handling or with the performance characteristics of tires that may not incorporate self-supporting features. Thus, it should be appreciated that use of the term handling performance herein refers generally to the handling performance of either deflated or inflated tires and tire-vehicle combinations, unless otherwise specified.

In one exemplary embodiment, the subject testing process typically begins by positioning a deflated self-supporting tire on a selected wheel of a test vehicle such that both tire beads are properly seated on the wheel rim. Each axle of a test vehicle is typically evaluated separately, so front and rear positions are selected and tested independently and appropriately. The test vehicle with selected deflated tire(s) may then preferably be subjected to a plurality of different driving maneuvers. Examples of the type of testing maneuvers that may be utilized include those representative of steady state, throttle lift-off, transient state, or emergency driving situations. A general objective of the disclosed tire testing technology is then to provide an established procedure for evaluating tire performance when such a tire—test vehicle combination is subjected to selected driving maneuvers.

A subjective evaluation in accordance with the present subject matter preferably corresponds to some overall tire performance rating based on various performance values that may be obtained or assigned during a given test process. Performance values may correspond to subjective and/or objective ratings that help characterize deflated tire handling performance. Objective ratings typically correspond to data that is measured by and obtained from various instruments that are employed in conjunction with a test vehicle. Instrumentation in accordance with the disclosed technology preferably includes a speedometer and a calibrated G-analyst accelerometer or equivalent device that is capable of measuring instantaneous three-dimensional acceleration of a test vehicle in g-units. Subjective ratings are typically judgements gauged by a test driver that relay the appropriateness of a tire's deflated handling performance level for the tire-vehicle system and absolute level of performance. A subjective evaluation preferably reflects a collection of predefined testing philosophies and target standards such as those disclosed in accordance with the present subject matter.

There are certain advantages that subjective testing offers over some forms of completely objective testing, including cheaper and more efficient systems and a more accurate representation of a potential user's experiences in the marketplace. These and other reasons make subjective ratings an essential component in the present testing technology. Since many exemplary embodiments of the subject testing system and methodology incorporate subjective as well as objective performance measures, an overall performance rating based on such measures should invariably be regarded as a subjective evaluation of tire handling performance. By practicing aspects of the disclosed technology, subjective evaluations and overall ratings are preferably characterized by small and normal dispersion among test drivers, conditions, and variables.

Exemplary standardized reporting grids are disclosed in accordance with the present subject matter to facilitate the recording of performance values and other testing information. The recorded information can then be utilized to determine an overall tire performance rating. The overall rating may be provided on a common 0 to 100 scale so that end users, including customers, manufacturers, and others in the marketplace can readily comprehend and communicate about the ratings. An overall rating should provide sufficient information to determine whether or not a particular tire is acceptable for its local market and for certain applications. Tire acceptability as will be understood from the remaining disclosure should adequately focus not only on levels of tire-vehicle system stability, but also on how and why different levels of system stability occur.

The subject system and method for testing deflated tire handling is hereafter presented in the context of some general aspects of the technology that contribute to exemplary embodiments of the invention. A first aspect of the disclosed technology corresponds to test preparation and set-up, including driving conditions and testing tools. Such general testing considerations may be discussed with reference to FIG. 1. Another aspect of the present system and method involves different driving maneuvers that a test vehicle may be subjected to as part of the testing processes. Exemplary driving maneuvers are depicted in FIGS. 2 through 8, respectively, and will be discussed with reference to various objective and subjective criteria that may be evaluated in accordance with each driving maneuver. Performance values relating to testing criteria may be recorded in a standardized reporting grid, such as the exemplary configuration illustrated in FIG. 8. Ratings may then finally be calculated in accordance with the performance values, a common rating scale, and various algorithmic formulas. Aspects of the algorithmic formulas, including conversion tables and equations are displayed in and will be discussed with reference to FIGS. 9, 10, 11, and 12.

Selected combinations of the aforementioned aspects of the invention correspond to a plurality of different embodiments of the invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function. Similarly, certain process steps may be interchanged or employed in combination with other steps to yield additional exemplary embodiments of a deflated tire handling testing method.

Reference will now be made in detail to the presently preferred embodiments of the subject deflated tire handling system and related methodology. Referring now to the drawings, FIG. 1 provides a perspective view of an exemplary tire—test vehicle combination 10 in accordance with the subject system and method for testing tire handling performance. A test vehicle 12 for purposes of deflated tire testing could comprise a variety of different vehicle types, including cars and small trucks. Test vehicle 12 and the maneuvers it is subjected to are intended to represent vehicles and driving situations that may occur with a typical consumer. It may be desirable that tire testing performance be rated as pertaining to a specific vehicle type, in which case the size, weight, and drive configuration of test vehicle 12 should preferably correspond as close as possible to similar characteristics of the specified vehicle type. To ensure more uniform test results, test vehicle 12 should have its wheel system aligned properly and fuel tank and other fluid levels filled. If all test vehicles are required to be subjected to similar conditions, then uniform vehicle weight distribution and consistency among other parameters is more easily achieved. A G-analyst accelerometer 17 (represented as a basic instrumentation block) is provided with test vehicle 12 to obtain certain objective test measurements, and is preferably located generally near the test vehicle's center of gravity. For convenience, the black box instrumentation 17 may be mounted to the floorboard of test vehicle 17 generally near the vehicle's center of gravity. Such particular placement of G-analyst 17 facilitates the measurement of vehicle acceleration in three dimensions, movement along forward axis X, lateral axis Y, or vertical axis Z.

Not only should test vehicle characteristics be similar among tests to ensure uniform test results, but also test course characteristics should also preferably be as standardized as possible. Ideal test courses may correspond to identical track layouts with different portions of track, including straight track portions and curved track portions of varied radii. Since it is virtually impossible to assure that all potential test courses are the same, it should be appreciated that an important aspect to maintain among tests relates to the actual execution of the maneuvers, and not the course or vehicle that the maneuvers are executed in accordance with. Nevertheless, a test course should provide a variety of severe deflated handling environments where test speeds and vehicle configuration are representative of situations potentially encountered by a driver. Although numerous test track compositions may be acceptable for testing, an example of a specific track surface composition is a burnished bituminous aggregate with slide number of about 55 to 60 as rated in accordance with the E274 test method and AST-501 reference tire standards as recognized by the American Society of Testing and Materials (ASTM).

Instrumentation is also preferably provided in accordance with a testing environment that is capable of measuring various weather-related quantities. Weather data preferably obtained in accordance with exemplary embodiments of the subject testing methodology may include such quantities as ambient temperature, track temperature, wind direction, wind speed, barometric pressure, and general weather condition (especially important if levels of precipitation are present). Selected of these weather parameters are preferably recorded by the test driver in order to document conditions that may affect the results among different tests.

Continuing with the description of the exemplary embodiments, a vehicle may preferably be tested in accordance with either its front axle or rear axle, wherein front axle refers to the general portion of vehicle 12 near which front tires 14 and 16 are positioned, and wherein rear axle refers to the general portion of vehicle 12 near which rear tires 18 and 20 are positioned. Deflated handling at each tire position 14 (right front), 16 (1eft front), 18 (right rear), and 20 (1eft rear) is preferably evaluated separately. A test driver preferably drives test vehicle 10 for a predetermined amount of time (for example, about seven miles) on a course including both straight and curved portions to effectively warm up a vehicle's tires. A warm-up step is preferably of sufficient duration and intensity to ensure that any mounting lube used on the wheels or tire beads has dried.

Once a tire—test vehicle combination is prepared for testing, a particular tire on the test vehicle is deflated. The deflation process may typically correspond to removing the valve core from a selected tire. Some exemplary testing procedures will test all four tires 14, 16, 18 and 20 on a test vehicle separately. For some testing situations, however, it may be sufficient to separately test only one selected tire on each of the front axle and rear axle respectively.

Figure 2:
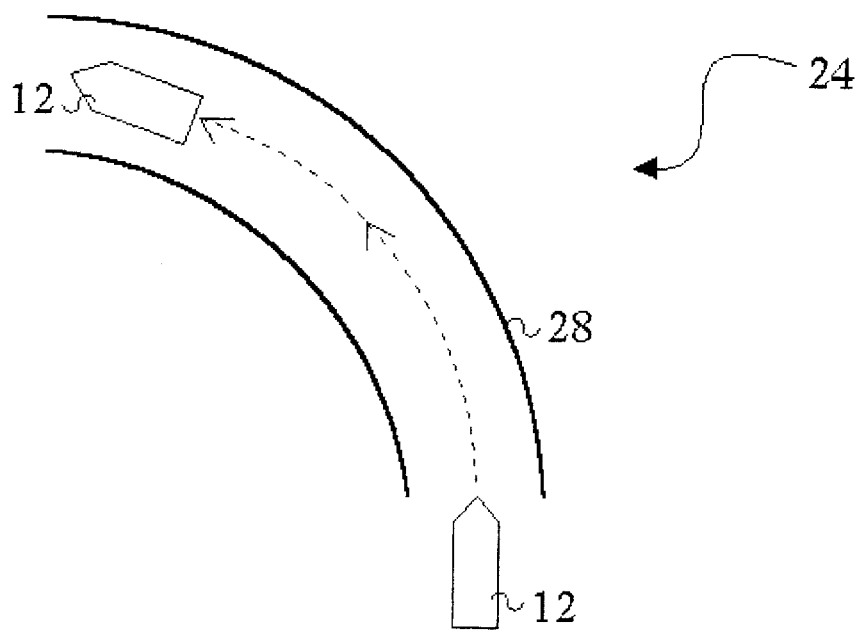
FIG. 2 displays an overhead perspective view of an exemplary steady state driving maneuver in accordance with aspects of the presently disclosed methodology and testing system.
Figure 3:
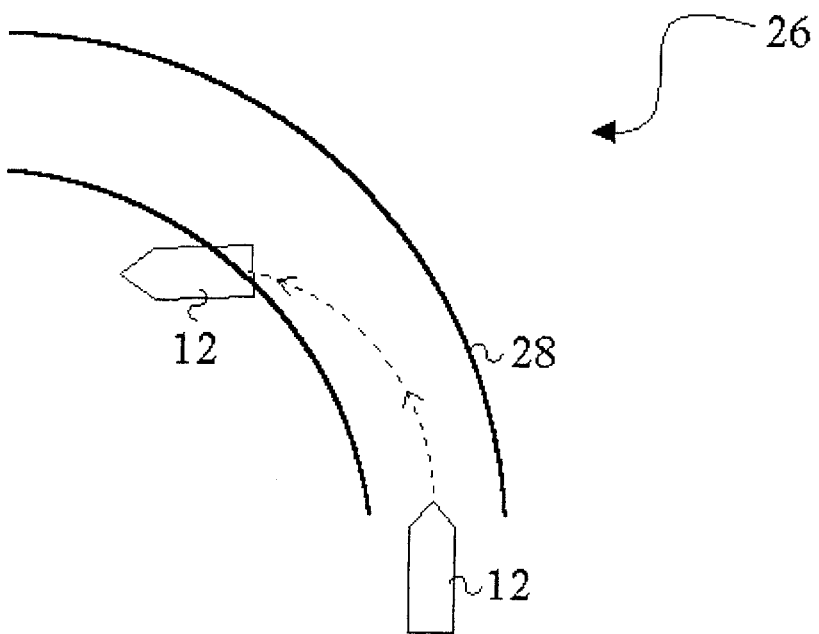
FIG. 3 displays an overhead perspective view of an exemplary throttle lift-off driving maneuver in accordance with aspects of the presently disclosed methodology and testing system.

Some of the exemplary testing maneuvers, such as those represented by the illustrations of FIGS. 2 and 3, are performed on a curved portion of track. When a vehicle is subjected to a driving maneuver along such a curved track, the vehicle may potentially experience two particular driving conditions, oversteer or understeer. Oversteer typically refers to the condition when a vehicle's rear end tends to swing to the outside of a turn when a driver is attempting to round a corner. Understeer typically refers to the condition when a vehicle's front end tends to push to the outside of a turn in a similar driving situation. Oversteer and understeer may thus refer to the respective situations when a vehicle turns more or less sharply than intended. In many instances, oversteer conditions pose a greater threat to a driver than understeer conditions. Nevertheless, testing maneuvers in which oversteer and understeer conditions may occur are preferred to ensure proper testing of all tire-vehicle situations.

Figure 7:
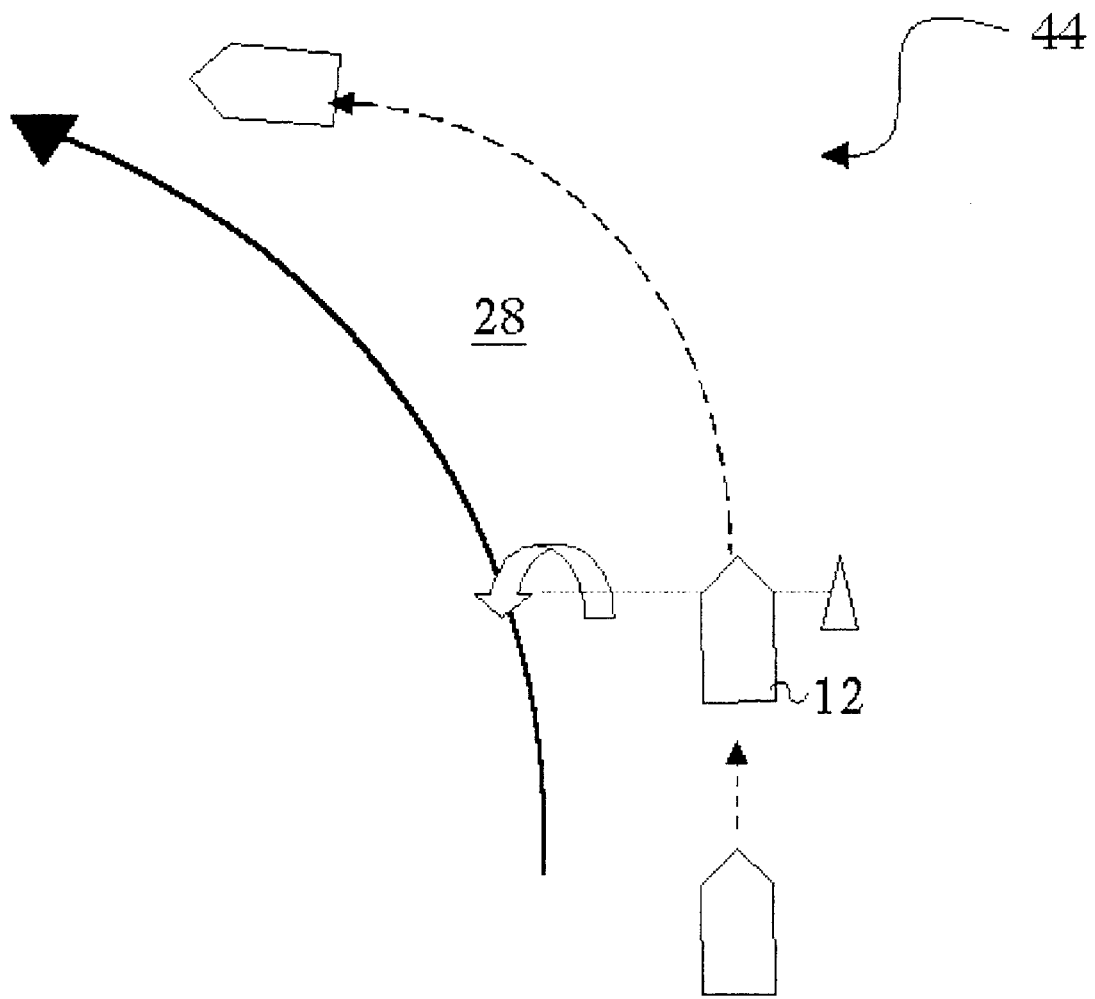
FIG. 7 displays an overhead perspective view of an additional exemplary emergency J-Turn with ABS driving maneuver in accordance with aspects of the presently disclosed methodology and testing system.

The curved track portions displayed in FIGS. 2, 3 and 7 intend to show a test vehicle 12 traveling in a counterclockwise direction along a curved portion of a to generally elliptical track. If a vehicle travels in a left-turn direction, such as shown in FIG. 2, then deflation of the right side tires could pose a substantial risk in certain driving situations. Thus, testing of the night front tire 14 and right rear tire 18 separately may be sufficient to test deflated handling performance during a left-hand turn. The remaining disclosure discusses driving maneuvers on curved track portions with respect to making left-hand turns. In such case, testing of the right side tires 14 and 18 is preferred. Alternatively, testing done on curved track portions where right-hand turns are negotiated, testing may preferably done with the left front tire 16 and then left rear tire 20 deflated. It should be understood that separate testing could still occur on all four tire positions if deemed appropriate, and still fall within the scope of the present testing methodology.

Now referring to FIGS. 2 through 7, respectively, discussion will be directed to types of different driving maneuvers that a driver may subject a tire—test vehicle combination to in accordance with the disclosed technology. Exemplary types of driving maneuvers are formulated to simulate driving operation in steady state, transient, throttle lift-off, or emergency situations. Particular driving maneuvers with respect to each of these exemplary self-descriptive driving situations are hereafter presented. It should be recognized that these maneuvers are provided merely as examples. Other driving maneuvers that represent aspects of steady state, transient state, throttle lift-off or emergency situations, as well as other potential driving situations, may also be practiced in accordance with the disclosed tire technology. During each respective driving maneuver, various objective and subjective criteria may be evaluated to help rate the overall handling performance of a tested tire.

FIG. 2 illustrates an exemplary driving maneuver 24 representative of a vehicle's steady state action performance. A test driver maneuvers test vehicle 12 around a curved track portion 28 while trying to maintain a driving trajectory that deviates as little as possible from its desired course with respect to time, hence a steady state driving maneuver. A driver should generally observe the steering angle required to maintain the desired trajectory around the curve, whereby the steering angle is generally defined as the point or difference in degrees that a steering wheel 30 is turned from some fixed upright position 32 (such as shown in FIG. 1). Exemplary dimensions for curved track portion 28 correspond to a portion of a generally circular track with a radius of about 70–90 meters. Other track dimensions may be utilized in accordance with the subject testing procedure provided that repeatable testing measures are possible. The maneuver as represented in FIG. 2 depicts test vehicle 12 traveling counterclockwise around track portion 28, but it should be appreciated that a similar maneuver could be performed in a clockwise direction.

In accordance with testing the handling performance of a deflated test tire, exemplary steady state driving maneuver 24 is preferably repeated over a range of different speeds. The range of test speeds may typically start at about 25–30 mph and end at about 60–65 mph with test increments at fixed intervals, for example 5 mph or 5 kph increments between test iterations. These speed levels may be higher or lower depending on the ability of a deflated tire to perform at generally safe levels of operation or stability. A test driver preferably maintains a fixed steering wheel angle for each speed increment within the speed range.

Various subjective and objective criteria are preferably evaluated during exemplary steady state driving maneuver 24 and during other exemplary driving maneuvers. Although different rating scales may be employed in accordance with the subject testing process, the exemplary testing embodiment as described herein utilizes a letter-based grading system for rating subjective performance criteria and a number-based instrument rating for objective performance criteria. In particular, subjective criteria are preferably assigned a performance rating of A, B, C, or D depending on quantitative judgement and perception of the test driver. An "A" performance rating preferably corresponds to deflated tire handling performance generally similar to that of an inflated tire; a "B" performance rating preferably corresponds to deflated tire handling performance with a small disturbance perceived; a "C" performance rating preferably corresponds to deflated tire handling performance with a medium disturbance perceived; and a "D" performance rating preferably corresponds to deflated tire handling performance with a severe disturbance perceived. Performance ratings may also include A/B, B/C, and C/D such that seven different overall grade rating options are available.

Many different objective criteria may be evaluated during exemplary steady state maneuver 24. Exemplary objective criteria that may be obtained from instrumentation provided in accordance with test vehicle 12 include steer angle (degrees), vehicle speed (mph or kph), forward vehicle acceleration (g), and lateral vehicle acceleration (g). Two particular objective performance measures that are preferably obtained in accordance with exemplary embodiments of the subject invention include the lateral acceleration measured at steady state when initial tire system instability is first perceived by a test driver and also the maximum lateral acceleration that occurs when a tire system is in a state of instability saturation. These two particular quantities are preferably measured in "g"s by a vehicle's G-analyst instrumentation (or by other appropriate measure) and the two obtained "g-ratings" are hereafter denoted as $\alpha T1$ and $\alpha T2$, respectively.

Subjective criteria often relate to yaw, which is generally defined as the rotation of test vehicle 12 around its vertical axis (the Z axis as represented in FIG. 1.) Two exemplary subjective criteria that are preferably rated during steady state maneuver 24 include the yaw velocity, or how fast a vehicle rotates around its vertical axis, and the yaw angle, or how far a vehicle rotates around its vertical axis. Other exemplary subjective criteria that may be evaluated in accordance with a steady state driving maneuver and that should be known and understood by those in the related art include the magnitude of lateral acceleration, level of lateral damping, amount of steady state balance, and progressivity of the steady state maneuver at selected levels of system stability. As previously mentioned, each subjective criteria is preferably evaluated by a test driver during the driving maneuver and then assigned a grade rating of A, B, C, or D. In addition, a driver's subjective comments may also be recorded as part of the testing process and corresponding documentation. Comments may readily be provided in accordance with any part or step of a testing process and should be provided either in a reporting grid or supplemental documentation. Such comments may make it easier for a test driver to justify assigning a very good grade or very poor grade for a particular testing criteria.

FIG. 3 illustrates an exemplary driving maneuver 26 intended to simulate a driving maneuver in which longitudinal load transfer due to throttle "lift-off" occurs. A test driver maneuvers test vehicle 12 around curved track portion 28, in a manner that aims to solicit severe system instability with vehicle pitch. After obtaining an $\alpha T1$ value during steady state driving maneuver 24, the driver preferably performs a throttle lift-off maneuver 26 by maintaining a fixed steering wheel angle such that the lateral acceleration of the vehicle is slightly below the previously obtained $\alpha T1$ value. Vehicle speed should preferably be no more than 3 mph or 5 kph less than the vehicle speed at which $\alpha T1$ was obtained, and as low a gear as possible should preferably be engaged during throttle lift-off maneuver 26.

Various objective and subjective criteria may be evaluated during exemplary lift-off maneuver 26. These may include selected items of the objective and subjective criteria that were evaluated during exemplary steady state maneuver 24. Particular subjective criteria that may be assigned grade ratings by a test driver during such a throttle lift-off maneuver may include yaw velocity, yaw angle, progressivity of the lift-off maneuver, and/or the ability to maintain the desired driving trajectory.

Figure 4:
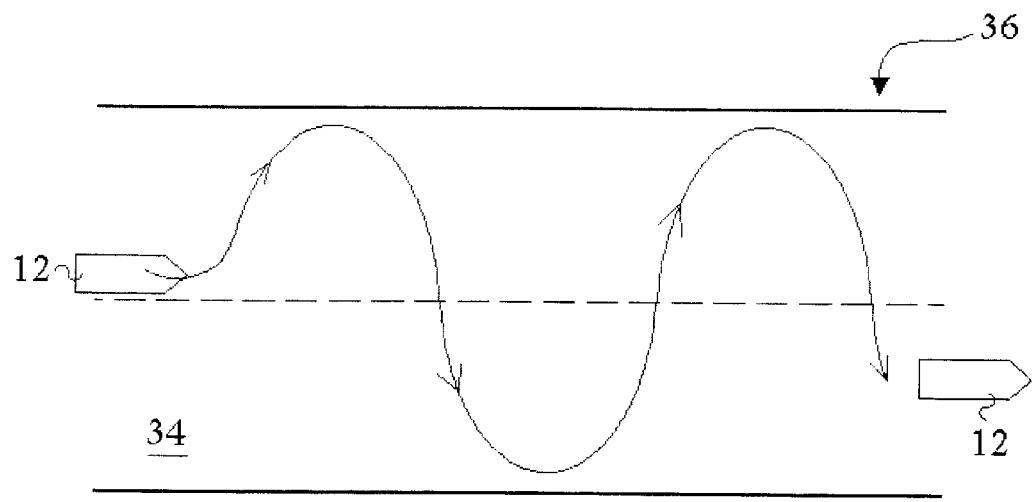
FIGS. 4 and 5, respectively, display overhead perspective views of exemplary transient driving maneuvers in accordance with aspects of the presently disclosed methodology and testing system.
Figure 5:
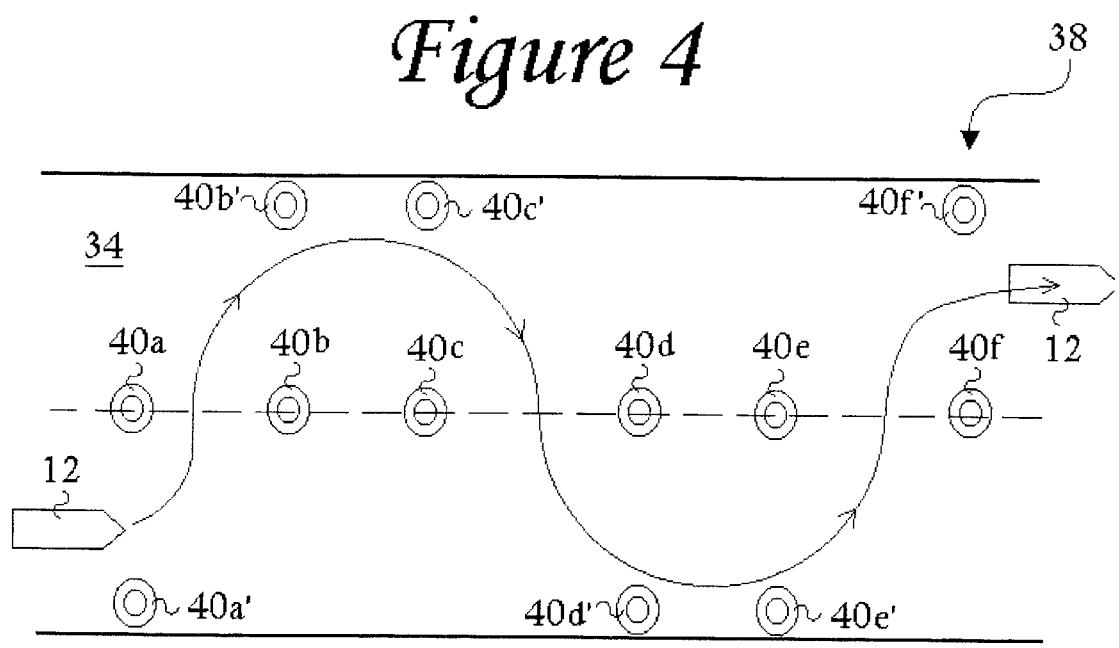

FIGS. 4 and 5, respectively, illustrate exemplary driving maneuvers representative of a vehicle's transient state performance, or performance during which the speed and movement of a vehicle may vary with time. Exemplary transient state maneuvers 36 and 38 are preferably performed on a straight portion 34 of testing track. Track portion 34 may preferably be about as wide as two traffic lanes, or about 8 meters wide. As with curved track portion 28, a significant aspect of the dimensions and quality of straight track portion 34 is that repeatable testing measures are possible.

In accordance with exemplary transient state maneuver 36 of FIG. 4, a test driver preferably maneuvers test vehicle 12 in a generally sinusoidal steering path along straight track portion 34 to evaluate the symmetry of steering response of test vehicle 12 with lateral load transfer. Transient state maneuver 36 is preferably performed using generally slow and smooth steering inputs by a test driver, and more particularly, with angular steering changes of no more than 80°/second in both clockwise and counterclockwise directions. Driving maneuver 36 is preferably performed at a fixed target speed, for example 55 mph, such that the steering input yields driving performance at a target g-level, or target amount of lateral acceleration. Desired target g-level intensities may vary depending on particular tire testing criteria, including the marketplace for which a tire is intended and the vehicle application. Thus, it may be preferred to implement transient maneuver 36 at different g-level intensities, for example, repeatedly performing maneuver 36 with target g-levels of 0.5 G, 0.6 G, and 0.7 G, respectively. A test at a higher g-level may be effected by using a greater input steer angle limit in each direction during maneuver 36. When performing maneuver 36 at a desired g-level, it is preferable that the target g-level be achieved with a tolerance of about ±0.02 G in both directions.

Exemplary test maneuver 36 may be performed as an attempt to determine levels of degradation in vehicle balance and normal steering response when test vehicle 12 is used to steer from one lane to another while maintaining a generally equivalent angular steering input in both turning directions. In general, it is desirable that deflated tire handling performance yield minimal degradation in vehicle balance. Several criteria may be evaluated in accordance with test maneuver 36 to rate tire handling performance. One particular objective criterion that may be obtained during test maneuver 36 is the target or peak g-level in each left and right turning direction. This information may be obtained from a G-analyst or other accelerometer device and combined with the ±0.02 G tolerance can be used to ensure the symmetry and repeatability of driver input in both steered directions. Other objective or subjective criteria may be evaluated in accordance with transient maneuver 36, including selected of the criteria previously mentioned in accordance with other driving maneuvers. Particular subjective criteria that may preferably be evaluated in accordance with transient state maneuver 36 include the symmetry of tire-vehicle steering response, symmetry of progressivity, yaw velocity, and yaw angle. Each subjective criterion may be assigned a respective grade rating based on a tire's performance at a given target g-level.

Test maneuver 38 is another exemplary driving maneuver that may be performed to test aspects of deflated tire handling performance during vehicle operation in transient state. Exemplary test maneuver 38 preferably involves a driver maneuvering tire—test vehicle combination 12 in between a prepositioned array of cones 40a–40f and 40a'–40f' or other similar markers. A particular example of the spacing among cones 40a–40f is thirty meters between cones 40a and 40b, thirty meters between cones 40b and 40c, thirty meters between cones 40c and 40d, thirty meters between cones 40d and 40e, and thirty meters between cones 40e and 40f. Each of cones 40a–40f is preferably aligned along the center of straight track portion 38 (represented by the dashed line), and cones 40a'–40f' generally extend away from respective cones 40a–40f in a direction perpendicular to the center dashed line.

Test maneuver 38 preferably assimilates two single lane changes, one in each right and left direction. A target vehicle speed is preferably maintained throughout transient maneuver 38. Any number of subjective and objective criteria may be evaluated in accordance with driving maneuver 38, including selected of the aforementioned criteria. A particular objective criterion that may be obtained in accordance with test maneuver 38 is the number of cones 40 that were knocked down during the maneuver. Other particular subjective evaluations may preferably correspond to graded ratings for steering precision, oversteer severity, and understeer severity.

Figure 6:
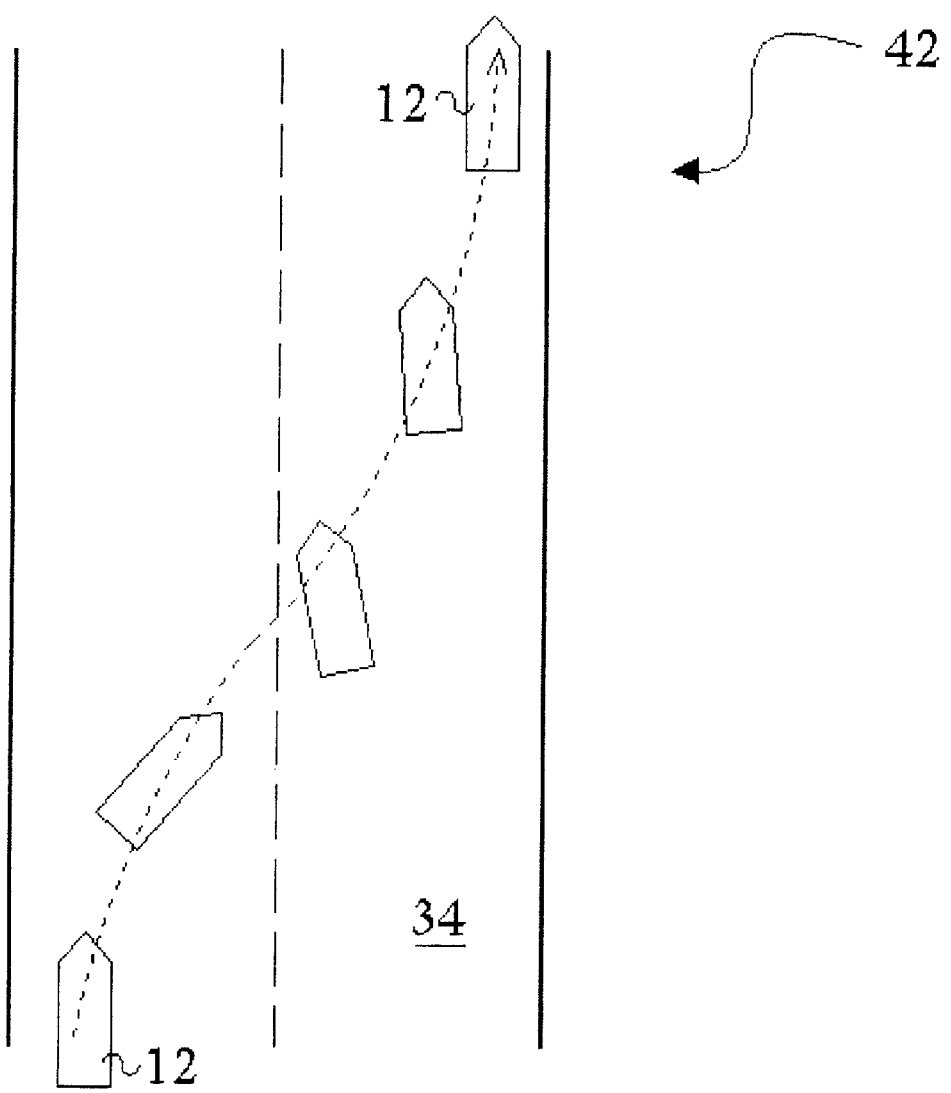
FIG. 6 displays an overhead perspective view of an exemplary emergency lane change driving maneuver in accordance with aspects of the presently disclosed methodology and testing system.

The testing maneuvers discussed with reference to FIGS. 2 through 5, respectively, intended to represent selected of steady state, throttle lift-off, and transient state driving situations. These types of maneuvers often correspond to driving situations that a tire-vehicle combination may typically be subjected to in the public domain or by a typical consumer. For example, an average driver in North America during normal driving conditions typically experiences lateral acceleration at g-levels no higher than about 0.5 G. Thus, aspects of the above-disclosed testing maneuvers may cater to assuring effective deflated handling performance at or below normal driving conditions. In order to assimilate driving performance in abnormal conditions, it may be preferred to include an emergency state test maneuver with the subject tire testing methodology. Emergency test maneuvers may preferably represent a driving situation in which a driver must subject a vehicle to a very fast or sudden change in speed or position. FIGS. 6 and 7 illustrate exemplary emergency driving maneuvers in accordance with the disclosed testing system and methodology. Due to generally greater risks associated with these exemplary types of driving maneuvers, a test driver should attempt these test maneuvers (and others) with utmost safety and appropriate precautionary measures.

FIG. 6 displays an exemplary maneuver 42 that generally represents a fast and sudden lane change, made as if trying to avoid a road hazard. Maneuver 42 is preferably performed on a generally straight portion of track 34, such as that in FIGS. 4 and 5. Track portion 34 should preferably be at least 8 meters wide such that a lane change from one four meter lane to another can be simulated. Exemplary emergency maneuver 42 is preferably used to test the deflated handling performance of rear tires, but may be utilized for other testing situations. FIG. 6 represents test vehicle 12 performing emergency lane change maneuver 42 in the night direction. However, emergency test maneuver 42 may also preferably be performed in the left direction to ensure testing of both potential oversteer or understeer situations.

Emergency driving maneuver 42 is preferably performed while test vehicle 12 is at a fixed entry speed. A driver then preferably subjects tire—test vehicle combination 12 to a fast and sudden steering input of generally about 300°/second with a large steer angle of generally about 90°. Maneuver 42 may first be performed at a generally low fixed speed, for example 25–30 mph. The maneuver is then preferably repeated at incremented speeds, for example 5 mph or 5 kph higher than the previous fixed speed. The fixed speed is preferably incremented until the beginning of tire system instability is observed. The speed at which tire instability appears during subjection to emergency lane change maneuver 42 is preferably recorded as a criterion for rating the deflated handling performance. Other evaluations that may be made in accordance with test maneuver 42 include yaw rate, yaw angle, progressivity, elasticity in grip recovery, controllability, and lateral damping. Each of these exemplary evaluation terms should be known and understood by those in the art of tire performance and related testing technology. Other objective or subjective criteria, not specifically mentioned with regards to test maneuver 42, may also be evaluated in accordance with the subject testing system and method.

FIG. 7 represents another exemplary emergency test maneuver 44 intended to evaluate selected aspects of deflated tire handling performance. Maneuver 44 corresponds to a fast and sudden "J-Turn" with invocation of anti-lock brakes used preferably to test deflated handling performance of front tires. In accordance with emergency J-turn maneuver 44, a driver preferably provides a high steering angle (generally about 180°) with high angular speed input (generally about 300°/sec) to the steering wheel of test vehicle 12. Maneuver 44 is preferably performed while a test vehicle's anti-lock braking system (ABS) is fully engaged.

A general objective of deflated handling performance in conjunction with emergency maneuver 44 is that the vehicle performs the full "J" turn while the tire remains seated on the wheel rim. The retention of a tire's bead to the wheel rim is a preferred criterion to be evaluated in accordance with maneuver 44. A tested tire is preferably assigned an unseating class grade of 1,2, or 3 depending on the unseating status of the tire's two beads from the wheel rim after being subjected to maneuver 44. An unseating class grade of 1 corresponds to neither of a tested tire's beads becoming unseated; an unseating class grade of 2 corresponds to one of a tested tire's beads becoming unseated; and an unseating class grade of 3 corresponds to both of a tested tire's two beads becoming unseated from the wheel rim. In addition to an unseating grade, other subjective and objective criteria may be evaluated in accordance with emergency maneuver 44, including selected of the aforementioned criteria. Particular criteria that may preferably be evaluated in accordance with maneuver 44 include the peak input g-level during maneuver 44 and the amount of deviation from desired vehicle trajectory.

Driving maneuvers and testing criteria constitute a major portion of the subject testing system and method. But another important aspect of the present subject matter is a reporting grid to be employed in recording the testing data obtained and assigned during the various test maneuvers. Standardized reporting grids in conjunction with established testing procedures facilitate uniform testing results that enable end users, including customers, manufacturers, and others in the marketplace to readily comprehend and communicate about resultant tire performance.

A particular tire handling test may constitute subjecting a tire—test vehicle to a plurality of different maneuvers during which various subjective and/or objective criteria are evaluated. In general, a reporting grid can be used to record desired data during the various driving maneuvers of a tire handling test. Such a reporting grid may include general information such as tire description and ratings as well as weather information. It may also include various alphanumeric ratings corresponding to the different criteria that are evaluated in accordance with selected driving maneuvers. A completed reporting grid should include data for each criteria that is to be evaluated for each selected driving maneuver in a tire handling performance test. An exemplary embodiment of a reporting grid in accordance with a corresponding exemplary testing process is displayed in FIG. 8.

Figure 8:
FIG. 8 provides a representation of an exemplary reporting grid in accordance with the subject system and method for testing tire handling performance.

The reporting grid of FIG. 8 is based on a specific selection of driving maneuvers and corresponding objective and subjective criteria that are selected for evaluation in accordance with each respective maneuver. It should be appreciated that other similar reporting grids may be utilized with different selected combinations of test maneuvers and evaluation criteria. Exemplary data is also provided in the reporting grid of FIG. 8. This data will be used to describe an exemplary rating scale and algorithm for calculating such a rating, and is provided merely as an example of the type of data that may be obtained and assigned during an exemplary tire handling test.

Now with reference to FIG. 8, exemplary reporting grid 46 provides a standardized data sheet that can be used in accordance with tire testing to achieve more uniform test ratings. The top portion of reporting grid 46 offers a space to record general testing information, including the name of the entity that the testing is being done for, and the date of issuance of the test. Additional information that may preferably be recorded to describe general tire and testing conditions includes the name of the test driver (test pilot), the date, the type of test vehicle, rim size, tire size, name or type of test circuit, the vehicle load weight, and the air pressure of both front and rear tires. Information regarding weather conditions may also preferably be included to help ensure proper testing and uniform results. Exemplary weather data may include the general weather condition (for example, sunny, cloudy, rainy, etc.), ambient temperature, track temperature, wind speed, and humidity. A reference tire number and batch tire number may also be recorded on reporting grid 46 to facilitate organization of the test process.

Various driving maneuvers are selected from the exemplary maneuvers disclosed herein, but may readily include other driving maneuvers. The maneuvers selected for evaluation purposes in accordance with reporting grid 46 include steady state maneuver 24, throttle lift-off maneuver 26, transient state maneuver 36, emergency lane change maneuver 42, and emergency j-turn maneuver 44. The J-turn maneuver 44 may be optional in accordance with this specific embodiment and is preferably included for deflated evaluation of front tires. For some applications, it may be preferred to perform the selected driving maneuvers in the order in which they are presented in exemplary test grid 46.

Four performance ratings are preferably recorded in reporting grid 46 based on evaluation of various steady state maneuvers. These exemplary ratings include a g-value for the lateral acceleration of the test vehicle when tire system instability is first observed ($\alpha T1$), a g-value for the lateral acceleration of the test vehicle when a tire system has reached its peak level of instability ($\alpha T2$), the yaw velocity, and the yaw angle. The two g-levels are preferably obtained from a G-analyst or other accelerometer instrumentation provided in accordance with the test vehicle. The yaw velocity and yaw angle are preferably assigned a grade rating as previously discussed with respect to subjective performance criteria.

One subjective performance rating is preferably recorded in reporting grid 46 during evaluation of throttle lift-off maneuver 26. This corresponds to an assigned letter grade rating for the magnitude of deviation from the intended path of desired vehicle trajectory.

Several performance ratings are preferably determined and recorded in exemplary reporting grid 46 during exemplary transient state maneuver 36. These exemplary criteria include ratings for the symmetry (at a marketplace target g-level of 0.x g, for example 0.5 g), of yaw velocity, and of yaw angle.

Additional performance ratings are preferably obtained and recorded in reporting grid 46 in accordance with exemplary emergency maneuvers 42 and 44. For emergency lane change maneuver 42, the speed at initial instability (instability limit speed in mph or kph) is recorded. For emergency j-turn maneuver 44, an unseating class of 1, 2, or 3 is preferably assigned, as well as the g-level of the maximum input lateral acceleration and a letter grade rating for the magnitude of deviation from the desired vehicle trajectory during maneuver 44.

FIG. 8 shows reporting grid 46 with exemplary data and performance ratings included. The data of FIG. 8 represents the performance ratings for four successive tire tests, but more or fewer sets of data may be desired. Information determined during the various testing maneuvers is preferably recorded in the grid, and then various performance ratings may be obtained from the provided data. The different calculated ratings shown on reporting grid 46 include a g-rating, an initial rating, and an overall rating of the deflated handling performance of selected tires. These ratings are provided as exemplary embodiments of the type of rating scales that may be utilized in accordance with aspects of the present subject matter. Many other different types of rating scales and calculation algorithms may also be used in accordance with the disclosed testing methodology. Details related to the exemplary algorithm for calculating the g-rating, initial rating, and overall rating will be discussed hereafter with respect to FIGS. 9 through 12, respectively.

Figures 9, 10:
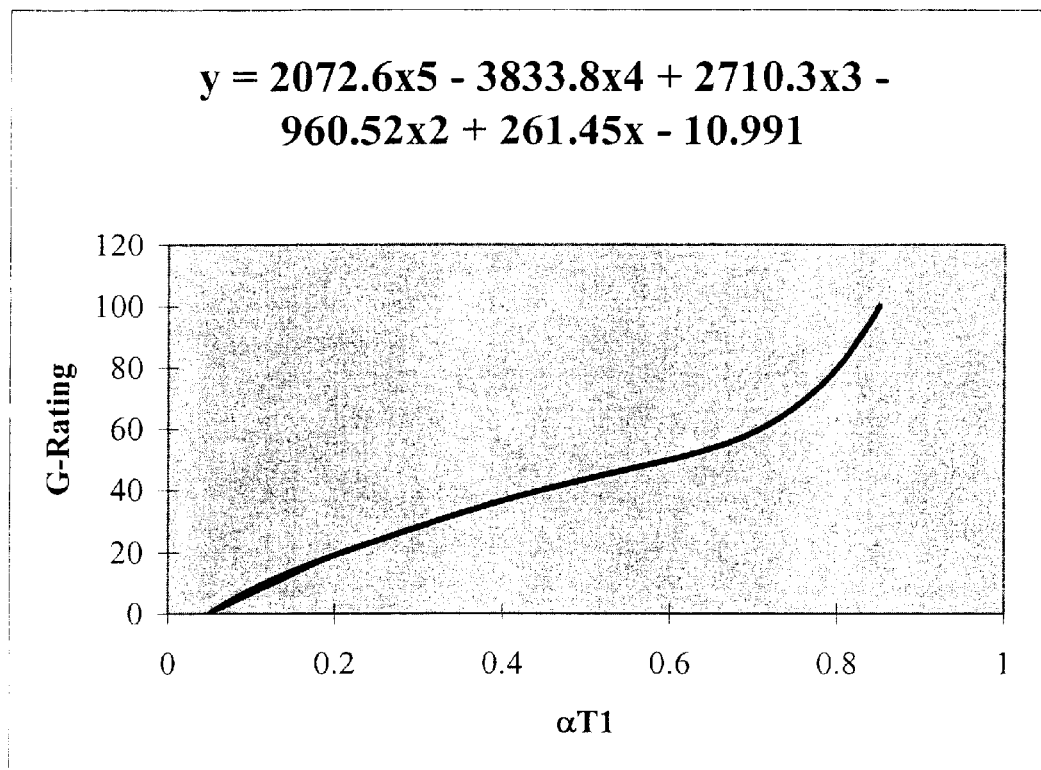
FIG. 9 provides a graphical and formula representation of an exemplary conversion process for inputting lateral acceleration and obtaining a corresponding G-rating in accordance with aspects of the disclosed technology.
FIG. 10 displays an exemplary conversion table for relating a subjective grade rating to a numerical point rating in accordance with the present subject matter.

FIG. 9 provides a graphical and formula representation of an exemplary conversion process for inputting lateral acceleration and obtaining a corresponding G-rating. The formula conversion is based on a large collection of previous testing data that is fitted to the curve of FIG. 9. The curve, also represented by the algebraic formula $y=2072.6x^5-3833.8x^4+2710.3x^3-960.52x^2+261.45x-10.991$, uses an $\alpha T1$ g-level obtained during steady state maneuver 26 as the x-variable input to the formula, and yields a G-rating output as the y-variable solution to the equation. For example, an $\alpha T1$ input of 0.40 yields a G-rating output of 36, and an $\alpha T1$ input of 0.65 yields a G-rating output of 54.

The initial rating is another exemplary rating calculated to characterize deflated tire handling performance. The initial rating (shown below the transient state data in grid 46) is used to rate the deflated handling performance of a tire that has been subjected to steady state maneuver 24, throttle lift-off maneuver 26, and transient state maneuver 36. The initial rating may also be termed a non-emergency rating since it does not take into account any performance ratings from emergency maneuvers. The initial rating is calculated from the G-rating and other averaged subjective grade ratings recorded in grid 46 for the respective steady state, throttle lift-off, and transient state maneuvers. The first step that preferably occurs when calculating the initial rating is to convert all the letter grade ratings to numerical values.

FIG. 10 displays an exemplary conversion table used for this process. As shown, an A rating is preferably converted to a point rating of 6.0, an A/B rating corresponds to a point rating of 5.0, a B rating corresponds to a point rating of 4.0, a B/C rating corresponds to a point rating of 3.0, a C rating corresponds to a point rating of 2.0, a C/D rating corresponds to a point rating of 1.0, and a D rating corresponds to a point rating of 0.0. Each individual grade rating in grid 46 is individually converted to its respective point rating. All point ratings are then averaged and rounded to the nearest whole point. The rounded point average can only end up being an integer value from zero to six, and this rounded point average is then used in conjunction with the G-rating to obtain the initial rating.

Figure 11:
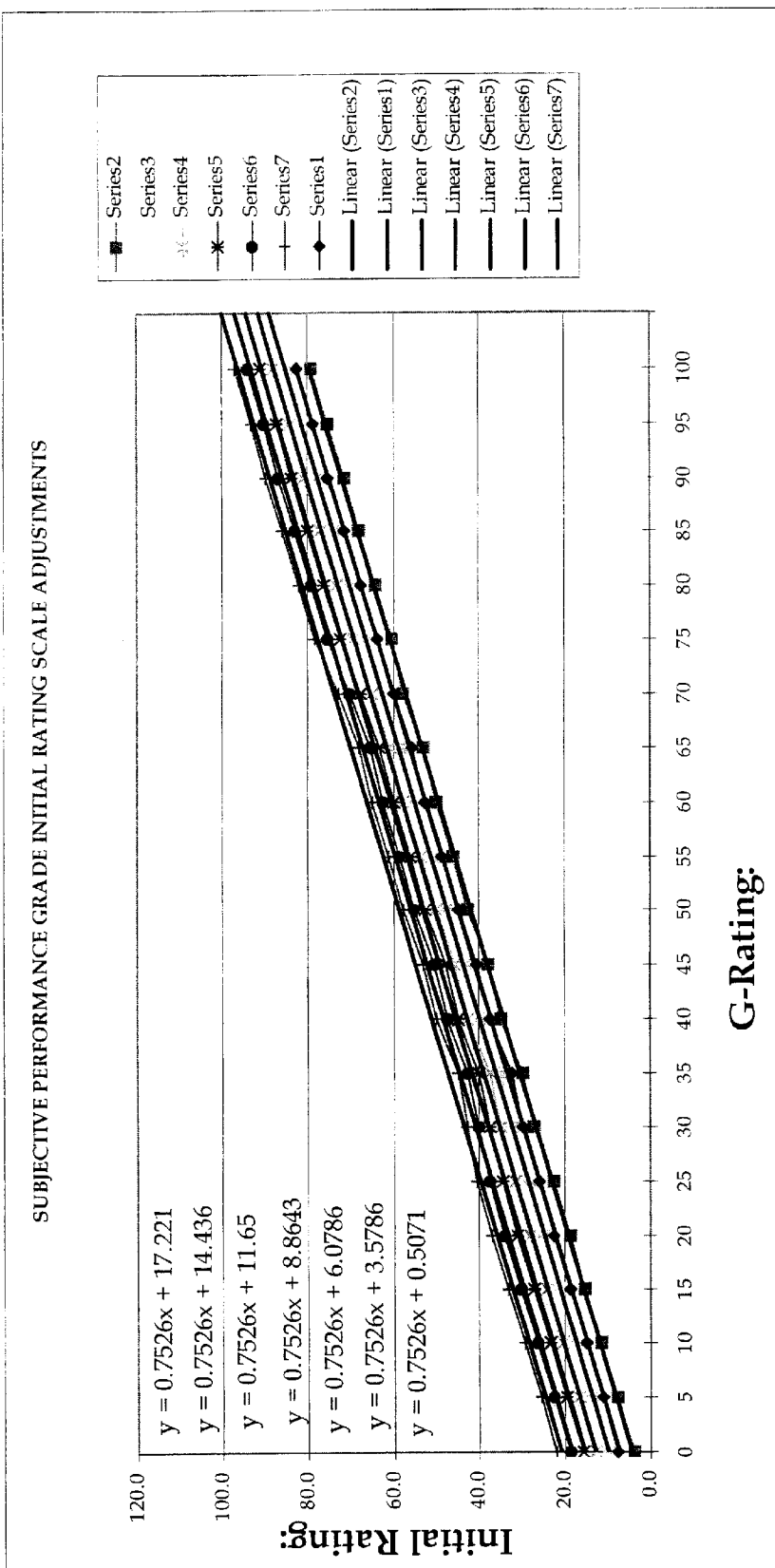
FIG. 11 provides a graphical and formula representation of an exemplary conversion process for obtaining an initial rating of tire performance in accordance with the G-rating and subjective grades.

FIG. 11 provides a graphical and formula representation of an exemplary conversion process for obtaining an initial rating based on the G-rating and averaged subjective ratings. There are seven different equations in FIG. 11 that may be utilized to calculate the initial rating depending on the seven different possibilities for the rounded letter grade point average obtained from the subjective grades. The top equation ($y=0.7526x+17.221$) should be used when the rounded point average is a 6.0, the second equation ($y=0.7526x+14.436$) should be used when the rounded point average is a 5.0, the third equation ($y=0.7526x+11.65$) should be used when the rounded point average is a 4.0, the fourth equation $y=0.7526x+8.8643$) should be used when the rounded point average is a 3.0, the fifth equation ($y=0.7526x+6.0786$) should be used when the rounded point average is a 2.0, the sixth equation ($y+0.7526x+3.5786$) should be used when the rounded point average is a 1.0, and the last equation ($y=0.7526x+14.436$) should be used when the rounded point average is a 0.0. The previously calculated G-rating is then inputted as the x-variable to the selected, corresponding equation from FIG. 11, and the y-variable output becomes the assigned initial rating.

FIG. 12 displays a chart representation of how exemplary grade ratings obtained during exemplary driving maneuvers 24, 26 and 36 are converted to a rounded point average and combined with calculated G-ratings to obtain an initial rating. The example displayed in FIG. 12 corresponds to the data for each of the four batch numbers whose exemplary test data is provided in FIG. 8 in accordance with the subject test processes.

An example of how the initial rating is calculated for the first exemplary column of data in FIG. 8 is hereafter presented as an instructive example. The first data column of FIG. 8 contains six grade ratings corresponding to the steady state, throttle lift-off and transient state maneuvers, each of which needs to be converted to a point rating. Based on the conversion chart of FIG. 10, each C/D is converted to a 1.0 and each C is converted to a 2.0. This yields point ratings of 1.0, 2.0, 1.0, 2.0, 2.0, and 2.0, in the point ratings for set 1 (Batch #200041B) in FIG. 12. The average of these six grades is a 1.67, which rounded to the nearest whole number is 2.0. Since 2.0 is the rounded point average, the fifth equation ($y=0.7526x+6.0786$) of FIG. 11 is used to obtain an initial rating. The G-rating input previously calculated for an $\alpha T1$ value of 0.40 is 36. With 36 as the input to the fifth equation, an initial rating is calculated as $y=(0.7526*36)+6.0786=33.17\approx33$. Thus, 33 is the initial performance rating obtained from the exemplary first column of data in FIG. 8 and in accordance with the exemplary calculation algorithm of the present subject matter. Initial ratings for the other three test batches are similarly calculated in accordance with the algorithm presented herein.

Without the inclusion of emergency maneuvers in a deflated tire performance test, the initial performance rating discussed above may be used to augment the subjective rating of the tire's overall handling performance. The initial rating as calculated above is provided on a scale from 0 to 100. The 100-point scale is divided into rating zones to further illustrate when a tire is acceptable or unacceptable for certain applications. The zone configuration in accordance with the disclosed reporting grid and calculation algorithms corresponds to a "red zone" and a "green zone." The red zone corresponds to a rating of anywhere between and including 0 and 40, and preferably denotes that a tire is not acceptable for certain desired applications in the desired marketplace. A tire receiving a rating in the red zone may exhibit very poor lateral firmness, yaw stability, or yaw damping. Such a tire may also exhibit very poor system stability response, yaw characteristics, and progressivity. When testing includes an emergency driving maneuver, poor deflated handling performance during such a maneuver may also warrant the rating of a tire to fall in the red zone. The green zone corresponds to a rating of anywhere between and including 45 to 100, and generally means that a tire may be market acceptable for certain applications. A tire rated in the green zone preferably exhibits acceptable lateral firmness, provides progressive yaw velocity and yaw angle. A tire rated in the green zone should also preferably exhibit acceptable lift throttle stability and emergency avoidance maneuvers (when included in the testing process).

It should be noted that there is a five-point gap (from 40 to 45) in potential ratings available with this exemplary rating scale. Such a five-point gap is preferably practiced in overall ratings to minimize the potential for errantly submitting a faulty tire to a consumer in the marketplace. Thus, if an initial calculated rating falls anywhere between 41 and 44, the tire is preferably not market acceptable for all desired applications. It is generally believed that the accuracy of a test rating among drivers can only be assured within five points. The red and green zones with the five point gap thus ensures, for example, that a tire rated at 44 but that should have received a rating of 39 is not submitted to a customer due to the five point testing dispersion tolerance.

Although the initial rating may be used to provide a subjective evaluation regarding the deflated handling performance of a tire, preferred embodiments of the subject testing procedure also incorporate selected results and ratings from an emergency maneuver into the overall tire rating. In accordance with the data and ratings of FIG. 8, an overall rating is obtained based on the initial rating and the recorded results of the data corresponding to emergency lane change maneuver 42 and emergency J-turn with ABS maneuver 44. An example of how results from the emergency test maneuvers and bead unseating situations can affect the overall rating for a tire is disclosed in the chart of FIG. 13. This chart represents a conversion process that can occur to develop an overall tire rating based on an initial rating, the initial instability limit speed from lane change maneuver 42 and the unseating class rating from j-turn maneuver 44. Depending on whether a tire received a bead unseating class rating of 1,2, or 3, and at what speed the lane change initial instability limit speed was reached, a revised overall tire handling rating is obtained. For example, if a tire was characterized by a class 2 bead unseat and an initial instability limit speed of 25 mph (or 40 kph), then the tire should receive an overall rating of 30 according to FIG. 13.

If a tire receives a class 1 or class 2 bead unseat rating and a lane change initial instability limit speed of anything greater than 30 mph (or 50 kph), then there is no change needed in the overall tire rating. Also, it should be recognized that a tire preferably never receives a rating in the green zone when a class 3 unseat occurs during the j-turn with ABS testing maneuver. This may vary for different applications and different testing requirements, but in general it is unacceptable for both beads of a tire to become unseated at any time during the testing process.

An overall tire rating may also be subjectively determined by a test driver as opposed to being numerically calculated as the initial rating preferably may be. For example, ratings obtained in accordance with emergency lane change maneuver 42 and emergency j-turn with ABS maneuver 44 may be used to subjectively amend a tire's initial rating and provide the overall rating for the tire if it is warranted.

For a general understanding of this subjective determination, refer to the exemplary data and ratings of FIG. 8. Consider the data in column 2, wherein a tire received an initial rating of 44. A class 2 bead unseat and a lane change limit speed of 37.5 should yield no change in the initial tire rating based on the conversion table of FIG. 12. However, the tire received a fairly poor trajectory grade (C) during maneuver 44 and also exhibited a j-turn input g peak level of 0.7, less than the $\alpha T2$ value obtained during steady state testing. This emergency maneuver data is not a generally positive trend, and thus the overall rating is reduced from the initial rating, demonstrating that the tire's performance was not acceptable and pushing the overall rating into the red zone to ensure that it will not be recommended as market acceptable for the intended application. Overall red zone and green zone ratings can be interpreted in the same manner as initial red zone and green zone ratings.

Considering the data and ratings for column 4, a different exemplary scenario is seen. This tire received an initial rating of 55, and no changes to the rating were called for in accordance with the conversion table of FIG. 13. However, the tire exhibited very good performance during the emergency maneuvers, receiving high objective and subjective ratings, and thus the overall rating is subjectively increased by a test driver. This may be done to ensure that the tire receives the most appropriate rating for its overall performance level. Although this sort of subjective amendment may be made to a recommended, calculated initial rating when obtaining the overall rating for a tire, it should be appreciated that any such amendment should generally be no greater than ±5–10 points. Any test driver who subjectively changes an initial rating by more than the specified amendment range should preferably provide sufficient comments somewhere in his or her reporting grid to justify such an extreme measure.

Initial or overall tire ratings are determined in accordance with the disclosed testing procedures to provide a subjective evaluation of the deflated handling performance of tires. This evaluation may potentially be used by those in the marketplace to determine the relative level of a tire, and particularly whether or not its performance is acceptable for certain applications. Such ratings may be obtained in accordance with varied test maneuvers, different objective and/or subjective criteria and corresponding reporting measures, and modified rating scales and zone classifications. Aspects of preferred testing systems and procedures are disclosed herein and presented as a mere example of the myriad of potential testing systems that may be concocted from the disclosed technology.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for rating the handling performance of tires, wherein selected tires are positioned on a test vehicle such that a tire—test vehicle combination is subjected to predetermined maneuvers, and whereby ratings are obtained in accordance with such predetermined maneuvers, said method comprising the steps of:

assigning at least one steady state rating, wherein a steady state rating relates to the handling performance of a tire when such tire in combination with the test vehicle is subjected to a predetermined steady state maneuver;

assigning at least one transient state rating, wherein a transient state rating relates to the handling performance of a tire when such tire in combination with the test vehicle is subjected to a predetermined transient state maneuver;

obtaining a g-value corresponding to the lateral acceleration of the test vehicle during a selected predetermined maneuver at which a predefined level of tire-vehicle instability is exhibited; and calculating an initial tire performance rating based on the steady state and transient state ratings from said assigning steps and the g-value from said obtaining step.

2. A method for rating the handling performance of tires as in claim 1, further including the step of assigning at least one throttle lift-off rating, wherein a throttle lift-off rating relates to the handling performance of a tire when such tire in combination with a test vehicle is subjected to a predetermined throttle lift-off maneuver while cornering with a level of lateral acceleration close to the g-value of said obtaining step, and wherein said step of calculating an initial tire performance rating is further based on the lift-off rating from this additional assigning step.

3. A method for rating the handling performance of tires as in claim 2, wherein said throttle lift-off rating is assigned to a variable selected from the group including yaw angle, trajectory grade, and progressivity.

4. A method for rating the handling performance of tires as in claim 1, wherein said steady state rating is assigned to a variable selected from the group including yaw velocity, yaw angle, and progressivity.

5. A method for rating the handling performance of tires as in claim 4, wherein said transient rating is assigned to a variable selected from the group including symmetry of system response to steering input, yaw velocity, and yaw angle.

6. A method for rating the handling performance of tires as in claim 1, wherein the method and predetermined maneuvers are employed with at least one deflated tire such that the method rates the deflated handling performance of selected tires.

7. A method for rating the handling performance of tires as in claim 6, further including the steps of:

assigning at least one emergency criteria rating, wherein an emergency criteria rating relates to the handling performance of a tire when such tire in combination with a test vehicle is subjected to a predetermined emergency maneuver; and determining an overall tire performance rating based on the initial tire performance rating from said calculating step and from the emergency criteria rating from said step of assigning at least one emergency criteria rating.

8. A method for rating the handling performance of tires as in claim 1, further including the steps of:

assigning at least one emergency criteria rating, wherein an emergency criteria rating relates to the handling performance of a tire when such tire in combination with a test vehicle is subjected to a predetermined emergency maneuver; and determining an overall tire performance rating based on the initial tire performance rating from said calculating step and from the emergency criteria ratings from said step of assigning at least one emergency criteria rating.

9. A method for rating the handling the performance of tires as in claim 8, wherein said emergency criteria rating is assigned to a variable selected from the group including bead unseat class type, instability limit speed, peak input g-level, and trajectory grade.

10. A rating process for subjectively evaluating the deflated handling performance of tires, wherein the evaluated tires are positioned on selected wheels of a test vehicle, and wherein said rating process comprises the following steps:

assigning at least one steady state rating, wherein the steady state rating is obtained upon deflating a selected tire and subjecting it to a predetermined steady state maneuver;

assigning at least one transient state rating, wherein the transient state rating is obtained upon subjecting the selected deflated tire to a predetermined transient state maneuver;

assigning at least one emergency state rating, wherein the emergency state rating is obtained upon subjecting the selected deflated tire to a predetermined emergency state maneuver; and obtaining a tire performance rating by inputting the steady state, transient state, and emergency state subjective ratings into an algorithmic set of formulas such that the tire performance rating is an output of the algorithmic set of formulas.

11. A rating process for subjectively evaluating the deflated handling performance of tires as in claim 10, wherein the steady state ratings, the transient state ratings, and the emergency state ratings are each assigned a value on a scale represented by the values A, A/B, B, B/C, C, C/D, and D.

12. A rating process for subjectively evaluating the deflated handling performance of tires as in claim 10, further including a step of assigning at least one throttle lift-off rating, wherein the throttle lift-off rating is obtained upon subjecting the selected deflated tire to a predetermined throttle lift-off maneuver, and wherein the throttle lift-off rating is also input to the algorithmic set of formulas in said step of obtaining a tire performance rating.

13. A rating process for subjectively evaluating the deflated handling performance of tires as in claim 10, further including a step of obtaining a g-value corresponding to the lateral acceleration of the test vehicle during the predetermined steady state maneuver at the minimum vehicle speed for which instability of the self-supporting tire is first exhibited, and wherein the g-value is also input to the algorithmic set of formulas in said step of obtaining a tire performance rating.

14. A rating process for subjectively evaluating the deflated handling performance of tires as in claim 13, wherein the lateral acceleration g-value is obtained from accelerometer instrumentation provided in conjunction with the test vehicle.

15. A rating process for subjectively evaluating the deflated handling performance of tires as in claim 13, wherein each of said steps is performed at least once for a deflated tire positioned on a selected front wheel of a test vehicle, and wherein each of said steps is additionally performed at least once for a deflated tire positioned on a selected rear wheel of a test vehicle.

16. A rating process for subjectively evaluating the deflated handling performance of tires as in claim 15, wherein the predetermined emergency state maneuver performed for a selected deflated front tire comprises an emergency j-turn maneuver with ABS invoked.

17. A rating process for subjectively evaluating the deflated handling performance of tires as in claim 15, wherein the predetermined emergency state maneuver performed for a selected deflated rear tire comprises an emergency lane change maneuver.

18. A rating process for subjectively evaluating the deflated handling performance of tires as in claim 13, wherein the tire performance rating from said obtaining step comprises a numeric value in a range from 0 to 100.

19. A rating process for subjectively evaluating the deflated handling performance of tires as in claim 18, wherein the potential tire performance rating range of 0 to 100 is divided into at least first and second subranges, such that a tire which obtains a tire performance rating within the first subrange is market acceptable for certain applications and a tire which obtains a tire performance rating within the second subrange is not market acceptable.

20. A rating process for subjectively evaluating the deflated handling performance of tires as in claim 18, wherein the tire performance rating from said obtaining step is automatically calculated via computerized implementation of said algorithmic set of formulas, and the measured g-values and subjective ratings inputted thereto.

21. A subjective test method used to provide a performance rating for self-supporting tires, wherein a selected self-supporting tire is positioned on a test vehicle such that the resulting tire—test vehicle combination is subjected to a plurality of testing maneuvers, said subjective test method comprising the steps of:

subjecting the tire—test vehicle combination to a steady state testing maneuver;

obtaining an alphanumeric value for the lateral acceleration of the test vehicle at a point during the steady state testing maneuver at which the tire-vehicle system achieves a predetermined level of initial instability;

assigning alphanumeric values to at least one steady state performance variable, wherein the alphanumeric values relate to the performance of the selected self-supporting tire during subjection to the steady state testing maneuver;

subjecting the tire—test vehicle combination to a transient state testing maneuver;

assigning alphanumeric values to at least one transient state performance variable, wherein the alphanumeric values relate to the performance of the selected self-supporting tire during subjection to the transient state testing maneuver;

subjecting the tire—test vehicle combination to an emergency testing maneuver;

assigning alphanumeric values to at least one emergency performance variable, wherein the alphanumeric values relate to the performance of the selected self-supporting tire during subjection to the emergency testing maneuver; and determining a tire performance rating based on algorithmic combination of the alphanumeric values corresponding to the lateral acceleration and the steady state, transient state and emergency performance variables.

22. A subjective test method used to provide a performance rating for self-supporting tires as in claim 21, wherein at least one self-supporting tire is deflated before subjecting the tire—test vehicle combination to each testing maneuver such that the determined tire performance rating corresponds to deflated handling performance.

23. A subjective test method used to provide a performance rating for self-supporting tires as in claim 21, wherein said steady state performance values comprise yaw velocity and yaw angle.

24. A subjective test method used to provide a performance rating for self-supporting tires as in claim 21, wherein said transient performance variables comprise symmetry of steering response, yaw angle, and yaw velocity.

25. A subjective test method as in claim 21, further including the steps of:

subjecting the tire—test vehicle combination to a throttle lift-off driving maneuver; and assigning alphanumeric values to at least one throttle lift-off performance value, wherein the alphanumeric values relate to the performance of the selected self-sup tire during subjection to the throttle lift-off driving manuver; and wherein said step of determining a performance variable is based on algorithmic combination of the alphanumeric values corresponding to the lateral acceleration and the steady state, transient state, emergency, and throttle lift-off performance variables.

26. A standardized procedure for obtaining a deflated performance rating for self-supporting tires, wherein a selected deflated self-supporting tire is positioned on a selected wheel of a test vehicle such that the resultant tire—test vehicle combination is subjected to various maneuvers, and wherein predefined test ratings related to deflated tire performance upon the vehicle being subjected to selected of the various maneuvers are obtained for use in accordance with selected steps of said standardized procedure, said standardized procedure comprising the following steps:

obtaining a g-value for the lateral acceleration of the test vehicle when the tire—test vehicle is subjected to a steady state maneuver and when the tire vehicle system achieves a predetermined level of initial instability;

assigning a plurality of performance values for predefined testing criteria based on the tire's deflated performance when subjected to selected maneuvers;

calculating an initial tire rating based on the obtained g-value and the assigned plurality of performance values;

assigning at least one emergency performance value for predefined emergency performance criteria based on the tire's performance when subjected to an emergency maneuver; and determining an overall tire rating based on the initial tire rating and the assigned emergency performance value.

27. A standardized procedure for obtaining a performance rating for deflated self-supporting tires as in claim 26, wherein the maneuvers that the tire—test vehicle combination is subjected to include at least one steady state maneuver, at least one transient maneuver, at least one longitudinal load transfer maneuver, and at least one emergency maneuver.

28. A standardized procedure for obtaining a performance rating for deflated self-supporting tires as in claim 26, wherein the predefined testing criteria for which performance values are assigned are selected from the group yaw velocity, yaw angle, trajectory grade, symmetry, initial instability limit speed, and unseating class.

29. A standardized procedure for obtaining a performance rating for deflated self-supporting tires as in claim 26, wherein said overall tire rating is determined subjectively by a test driver, who adjusts the calculated initial tire rating based on selected subjective performance measures of the tested self-supporting tire.

30. A standardized procedure for obtaining a performance rating for deflated self-supporting tires as in claim 26, wherein the initial tire rating and the overall tire rating are provided on a point scale from 0 to 100, and wherein the overall tire rating may only be positively or negatively adjusted in said determining step by a maximum of 10 points from the calculated initial tire rating.

31. A standardized procedure for obtaining a performance rating for deflated self-supporting tires as in claim 30, wherein the rating point scale from 0 to 100 is divided into at least first and second subranges, such that a tire which obtains a tire rating within the first subrange is market acceptable for certain applications and a tire which obtains a tire rating within the second subrange is not market acceptable.

32. A standardized procedure for obtaining a performance rating for deflated self-supporting tires as in claim 31, wherein the emergency performance value comprises an unseating class grade related to the number of beads that remain seated on the wheel rim for a tested tire an emergency maneuver, and wherein a tire which has both beads unseat during the emergency maneuver will never receive an overall tire rating in the acceptable first subrange of the rating point scale.

33. A standardized procedure for obtaining a performance rating for deflated self-supporting tires as in claim 31, wherein said initial tire is automatically calculated via computerized manipulation of inputted parameters including the obtained g-value and assigned plurality of performance values.

* * * * *